(12) United States Patent
Cadra et al.

(10) Patent No.: US 10,030,114 B2
(45) Date of Patent: Jul. 24, 2018

(54) METHOD FOR PRODUCING POLYMER MATERIALS COMPRISING GOLD

(71) Applicant: COMMISSARIAT À L'ÉNERGIE ATOMIQUE ET AUX ÉNERGIES ALTERNATIVES, Paris (FR)

(72) Inventors: Stéphane Cadra, Saint Avertin (FR); Pierre Pouponeau, Joue-les-Tours (FR); Alexia Balland Longeau, Tours (FR)

(73) Assignee: COMMISSARIAT À L'ÉNERGIE ATOMIQUE ET AUX ÉNERGIES ALTERNATIVES, Paris (FR)

( * ) Notice: Subject to any disclaimer, the term of this patent is extended or adjusted under 35 U.S.C. 154(b) by 73 days.

(21) Appl. No.: 15/313,336

(22) PCT Filed: May 20, 2015

(86) PCT No.: PCT/EP2015/061172
§ 371 (c)(1),
(2) Date: Nov. 22, 2016

(87) PCT Pub. No.: WO2015/177243
PCT Pub. Date: Nov. 26, 2015

(65) Prior Publication Data
US 2017/0190860 A1 Jul. 6, 2017

(30) Foreign Application Priority Data

May 23, 2014 (FR) ..................... 14 54689

(51) Int. Cl.
C08J 9/00 (2006.01)
C08J 9/28 (2006.01)
(Continued)

(52) U.S. Cl.
CPC .............. *C08J 9/0066* (2013.01); *C08J 3/075* (2013.01); *C08J 3/2053* (2013.01); *C08J 9/28* (2013.01);
(Continued)

(58) Field of Classification Search
CPC ....................... C08J 9/0066; C08K 2003/0831
See application file for complete search history.

(56) References Cited

U.S. PATENT DOCUMENTS

2011/0137000 A1* 6/2011 Alexia ................. C07C 229/14
526/241
2012/0217432 A1* 8/2012 Balland Longeau . C07C 251/48
252/62.54

(Continued)

FOREIGN PATENT DOCUMENTS

WO 2009047245 A1 4/2009
WO 2011061229 A1 5/2011

OTHER PUBLICATIONS

C. Croix; C.-E. Sauvage; A. Balland-Longeau; A. Duchene; J. Thibonnet. "New Gold-Doped Foams by Copolymerization of Organogold(I) Monomers for Inertial Confinement Fusion (ICF) Targets" J Inorg Organomet Polym (2008) 18:334-343. (Year: 2008).*

(Continued)

*Primary Examiner* — Randy P Gulakowski
*Assistant Examiner* — Christina H Wales
(74) *Attorney, Agent, or Firm* — Pearne & Gordon LLP

(57) ABSTRACT

The invention relates to a method for the specific production of a polymer material doped by a first metal element, which is gold, and at least one second metal element, the first metal element and the at least one second metal element being identical or different from each other.

28 Claims, 1 Drawing Sheet

(51) Int. Cl.
*C08J 3/075* (2006.01)
*C08K 3/08* (2006.01)
*C08J 3/205* (2006.01)

(52) U.S. Cl.
CPC ............. *C08K 3/08* (2013.01); *C08J 2203/08* (2013.01); *C08J 2325/18* (2013.01); *C08J 2339/04* (2013.01); *C08K 2003/0831* (2013.01)

(56) References Cited

U.S. PATENT DOCUMENTS

2015/0284493 A1* 10/2015 Mattoussi ............ C08G 81/025
252/62.54
2017/0088649 A1 3/2017 Cadra et al.

OTHER PUBLICATIONS

Jian Cui; Guangfa Zhang; Lanxia Xin; Peng Yun; Yehai Yan; Feng Su. "Functional nanoscale metal—organic particles synthesized from a new vinylimidazole-based polymeric ligand and dysprosium ions". Journal of Materials Chemistry C. 2018. vol. 6, pp. 280-289 (Year: 2018).*

Baoji Hu; Tianbin Wu; Kunlun Ding; Xiaosi Zhou; Tao Jiang; Buxing Han. Seeding Growth of Pd/Au Bimetallic Nanoparticles on Highly Cross-Linked Polymer Microspheres with Ionic Liquid and Solvent-Free Hydrogenation. J. Phys. Chem. C 2010, 114, 3396-3400 (Year: 2010).*

Cao, Q., et al., "Polymer Monoliths with Exchangeable Chemistries: Use of Gold Nanoparticles As Intermediate Ligands for Capillary Columns with Varying Surface Functionalities", "Analytical Chemistry", Sep. 1, 2010, pp. 7416-7421, vol. 82, No. 17.

Chen, Y., et al, "Ultraflexible plasmonic nanocomposite aerogel", "RSC Advances", 2011, pp. 1265-1270, vol. 1.

Croix, C., et al., "New Gold-Doped Foams by Copolymerization of Organogold(I) Monomers for Inertial Confinement Fusion (ICE) Targets", "Journal of Inorganic and Organometallic Polymers and Materials", 2008, pp. 334-343, vol. 18.

Faith, D., et al, "Characterisation of Gold Particles of Various Size Distributions in Low Density Foams for Radiation Transport Experiments", "Fusion Science and Technology", Mar. 2004, pp. 90-94, vol. 45.

Moreau, L, et al., "Recent advances in development of materials for laser target", "Laser and Particle Beams", Jan. 1, 2009, pp. 537-544, vol. 27.

Zhang, J., et al., "Cobaltocenium-Containing Methacrylate Homopolymers, Block Copolymers, and Heterobimetallic Polymers via Raft Polymerization", "Macromolecules", Sep. 11, 2012, pp. 6857-6863, vol. 45.

NOTE: For the non-patent literature citations that no month of publication is indicated, the year of publication is more than 1 year prior to the effective filing date of the present application.

* cited by examiner

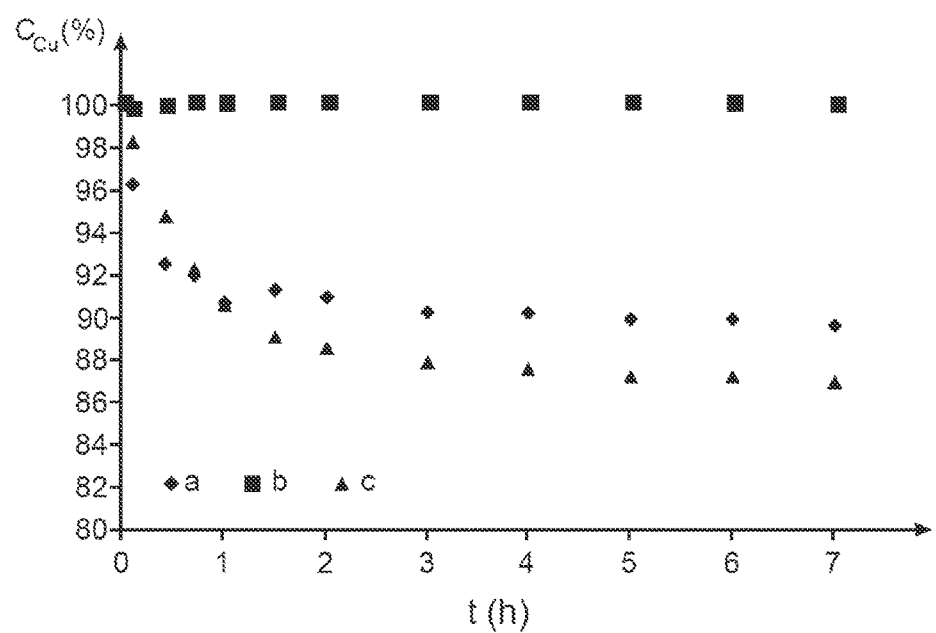

METHOD FOR PRODUCING POLYMER MATERIALS COMPRISING GOLD

CROSS-REFERENCE TO RELATED APPLICATIONS

This application is a U.S. national phase under the provisions of 35 U.S.C. § 371 of International Patent Application No. PCT/EP15/61172 filed May 20, 2015, which in turn claims priority of French Patent Application No. 14 54689 filed May 23, 2014. The disclosures of such international patent application and French priority patent application are hereby incorporated herein by reference in their respective entireties, for all purposes.

TECHNICAL FIELD

The present invention relates to a novel method for preparing polymer materials, in particular, polymeric foams, comprising gold and optionally another metal element, for which the content of gold and of the optional other metal element may be easily adjusted according to the needs of the application.

These materials, because of the combination of organic and inorganic elements, may have interesting properties of a mechanical, thermal, electrical or magnetic nature.

These polymeric materials may be used, notably in many applications where doping with gold is important, such as this is the case of supported catalysis, luminescent materials, magnetic materials, structured organometallic materials, materials for decontaminating organic and aqueous solutions, materials with ionic imprint. In particular, they may find their application in the elaboration of laser targets used during fusion experiments by inertial confinement.

The general field of the invention is thus that of polymeric materials doped with one or several metal elements.

STATE OF THE PRIOR ART

Considering that the field of application is extremely vast of this type of materials, many teams focus their research on techniques for elaborating such materials, such as:
  (co)polymerization of monomers bearing the metal element; and
  incorporation of metal particles for example, nano- or micro-particles in the polymerization medium or in an already formed polymeric matrix.

As regards (co)polymerization of metal monomers, this technique is based on the principle of the presence of the metal element in the polymerization medium, this presence being generated by the use of monomers bearing the desired dopant metal element, the metal element may be an integral part of the monomer molecule (in which case these are referred to as metal monomers) or may be bound to the latter by a complexation reaction.

This technique requires the development of chemistry specific to each specific type and may more specifically require the preparation of monomers associated with the metal element, which may prove to be tedious and long in terms of implementation, when the questions is to prepare a doped polymeric material for example, with gold or with another distinct metal element.

Finally, as regards the incorporation of metal particles, two routes have already been explored:
  incorporation of gold microparticles in a polymerization medium which is a precursor of a polymeric matrix, as described in Nazarov et al., Fusion Science and Technology, 2004, 45:5; and
  the incorporation of gold nanoparticles in an optionally modified organic matrix.

Thus, in Fusion Science and Technology, 2004, 45:5, a method for making gold-doped polymer materials is described, wherein the gold particles are directly put into contact with the monomers, the co-monomers, the catalyst and the pore-forming solvent. The difficulty with this method lies in obtaining a homogeneous distribution of the gold particles, since the latter may tend to agglomerate, which requires the use of an ultrasonic probe for optimizing the dispersion of the particles. However, taking into account certain monomers, like acrylate monomers, may polymerize during the use of ultrasonic waves, the dispersion of gold particles is achieved, preferably without the presence of the monomers and co-monomers. However, this precaution does not suppress the drawbacks related to the metal contamination induced by the degradation of the surface of the probe and related to the settling of the gold particles, once they are put into contact with monomers and co-monomers, which is detrimental to obtaining a homogenous distribution of the particles in the material. By applying this method with foams of trimethylolpropane triacrylate and gold particles with different diameters (0.2; 0.8-1.5; 1.5-3 and 5-9 µm), it has not been possible to obtain more than 15% by mass of gold incorporated into the foam which has furthermore a specific gravity of 50 mg·cm$^{-3}$.

As regards the incorporation of gold nanoparticles in the polymeric matrix, several options have been contemplated.

Thus, in Anal. Chem. 2010, 82 (17):6, a method for preparing a gold-doped polymeric foam is described, this method respectively comprising:
  a step for modifying a polymeric foam of poly(glycidylmethacrylate-co-ethylenedimethacrylate) consisting of having epoxide groups react with cysteamine, in return for which thiol groups are formed;
  a step for placing said resulting material in a chromatographic column, this material thus forming the filling material of the column; and
  a step for passing a commercial solution of gold nanoparticles (having a diameter ranging from 10 to 15 nm) over the aforementioned column, in return for which, the nanoparticles are captured by the thiol groups.

This method has the drawback of not allowing a homogeneous distribution of gold in the foam, in the case of use of a solution having a significant amount of nanoparticles, since the increase in the nanoparticle concentration may accelerate the saturation of the pores at the surface of the material.

In RSC Advances, 2011, 1:6, a method for making a gold-doped foam is described, consisting in a first phase, of dispersing gold nanoparticles having a diameter ranging from 13 to 101 nm in an agar-agar solution at 60° C. After cooling to room temperature, the resulting hydrogel is transformed into an aerogel by freeze-drying. By applying this method, the phenomenon of agglomeration of nanoparticles may be avoided. However, the nanoparticle content in the resulting foam does not exceed 8% by mass for a specific gravity of 28 mg/cm$^3$.

Considering what exists, the inventors set their goal to propose a novel method for preparing a polymeric material doped with gold and optionally with one or several other metal elements inter alia allowing:
  the incorporation of a significant amount of gold, if need be, for example an amount of gold having a mass content of more than 30%;
  optionally, the incorporation of another metal element in a controlled amount; and the modulation of the morphological properties of the material.

DISCUSSION OF THE INVENTION

The authors of the present invention surprisingly discovered that by associating during the manufacturing of the material, a first monomer with a second specific monomer having a particular complexation affinity depending on the nature of the impregnation medium, for gold or for another metal element, it is possible to obtain the advantages mentioned above.

Thus, the invention relates to a method for preparing a polymeric material doped with a first metal element, which is gold or at least one second metal element, said first metal element and said, at least one second metal element being identical or different from each other, said method comprising:

a) a step for copolymerization of at least one first monomer comprising at least one chelating group of said first metal element and of at least one second monomer comprising at least one chelating group of at least one second metal element, in return for which a polymeric material is obtained comprising repetitive units from the polymerization of said first monomer, which repetitive units comprise at least one chelating group of said first metal element and comprising recurrent units stemming from the polymerization of said second monomer, which recurrent units comprise at least one chelating group of said at least one second metal element, said second monomer being selected from among:

aromatic monomers comprising at least one aromatic ring, which ring comprises at least one ethylenic group, at least one hydroxide group —OH, or at least one oxime group and the optional salts of the latter; and the monomers comprising an alicyclic amine group; and said first monomer advantageously being a cyclic monomer comprising at least one nitrogen-containing group;

b) when the first metal element and said at least one second metal element are identical (i.e. they both correspond to the element gold), a step for putting the obtained material in a) in contact with an aqueous solution comprising gold, in return for which the gold is complexed to the aforementioned chelating groups; and b') when the first metal element and said at least one second metal element are different, a first step for putting the obtained material in a) in contact with an alcoholic solution comprising gold followed by a second step for putting the material in contact with an aqueous solution comprising said at least one second metal element.

Before entering more details in the description of this invention, we specify the following definitions.

By first monomer comprising at least one chelating group of a first metal element, is conventionally meant a monomer bearing at least one polymerizable group and comprising at least one pendant group able to complexify said first metal element, which means, in other words, that said first metal element is able to bind to said pendant group through a coordination bond by sharing a free doublet or by an ionic bond by sharing a negative charge borne by said pendant group with said first metal element to be fixed.

By second monomer comprising at least one chelating group of at least one second metal element, is conventionally meant a monomer bearing at least one polymerizable group and comprising at least one pendant group able to complexify said at least one second metal element, which means, in other words, that said at least one second metal element is able to bind to said pendant group through a coordination bond by sharing a free doublet or by an ionic bond by sharing a negative charge borne by said pendant group with said at least one second metal element to be fixed.

Conventionally, it is understood that said first monomer and said second monomer are different from each other.

By second metal element, when the latter is different from gold, is conventionally meant, an element belonging to the category of transition elements, lanthanide elements, actinide elements or elements selected from among Al, Ga, Ge, In, Sn, Sb, Tl, Pb, Bi and Po. More specifically, this may be a transition element such as copper.

From this innovative method for elaborating polymeric materials doped with gold ensue the following advantages:

when the first chemical element and said second chemical element are gold, it allows, by selecting the second specific monomer and selecting the aqueous medium such as the contacting medium, the incorporation of a significant amount of gold (for example, a mass content of more than 30%) into the polymeric material while giving the possibility of modulating the morphological properties of the material (for example, in terms of specific surface area, of specific gravity); and when the first chemical element and the second chemical element are different, it allows, by selecting the second specific monomer able to be complexify with at least one second metal element, preferentially in an aqueous medium and by selecting an alcoholic medium for the first contacting step and an aqueous medium for the second contacting step, the simple obtaining of a bimetal material based on gold; and it is easily reproducible, notably as regards the level of the first metal element and of the second metal element present in the polymeric material, because this level is related to the amount of first monomer and of second monomer.

As mentioned above, the method of the invention firstly comprises a step for copolymerization of at least one first monomer comprising at least one chelating group of said first metal element and of at least one second monomer comprising at least one chelating group of at least one second metal element, in return for which a polymeric material is obtained comprising recurrent units from the polymerization of said first monomer, said recurrent units comprise at least one chelating group of said first metal element and comprising recurrent units stemming from the polymerization of said second monomer, said recurrent units comprise at least one chelating group of said at least one second metal element, said second monomer being selected from among:

aromatic monomers comprising at least one aromatic ring, which ring comprising at least one ethylenic group, at least one hydroxide group —OH, at least one oxime group and optional salts thereof; and monomers comprising an alicyclic amine group.

Said first monomer advantageously is cyclic monomer comprising at least one nitrogen-containing group, it being understood that this cyclic monomer is different from the second monomer defined above.

More specifically, the first monomer may be a heteroaromatic monomer comprising one or several nitrogen atoms.

Heteroaromatic monomers comprising one or several nitrogen atoms may be vinylimidazole monomers, such as a vinylimidazole monomer fitting the following formula (I):

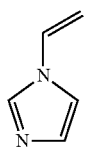

As regards the second monomer, this may be an aromatic monomer comprising at least one oxime group, it may specifically fit the following formula (II):

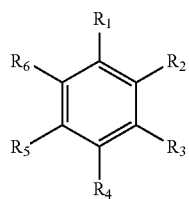

wherein:

$R_1$ is an ethylenic group;

$R_2$, $R_3$, $R_4$, $R_5$ and $R_6$ represent, independently of each other, a hydrogen atom, an —OH group, an amine group, a —CHO group, an oxime group, a hydrazone group, a carboxyl group —COOH, a halogen atom, a trialkylsilane group, and optional salts thereof, provided that at least of the groups $R_2$ to $R_6$ represents an —OH group and at least one of the groups $R_2$ to $R_6$ represents an oxime group.

By amine group, is conventionally meant a primary amine group —$NH_2$, a secondary amine group (i.e., an amine group for which one of the hydrogen atoms initially borne by the nitrogen atom is substituted with another group, such as an alkyl group) or a tertiary amine group (i.e., an amine group for which both hydrogen atoms initially borne by the nitrogen atom are substituted with another group, such as an alkyl group).

By oxime group, is conventionally meant a group comprising the —C=N—OH function, for example a group fitting the formula —CR'=NOH, wherein R' represents a hydrogen atom, an alkyl group, an aryl group, an alkylaryl group, a perfluoroalkyl group, a perfluoroaryl group, a perfluoroalkylaryl group, an acyl group, a carbonyl group, a trialkylsilane group.

By hydrazone group, is conventionally meant a group comprising the function —C=N—N—, for example, a group fitting the formula —CR'=N—NR"R'", wherein R', R" and R'" represent, independently of each other, a hydrogen atom, an alkyl group, an aryl group, an alkylaryl group, a perfluoroalkyl group, a perfluoroaryl group, a perfluoroalkylaryl group, an acyl group, a carbonyl group or a trialkylsilane group.

By halogen atom is conventionally meant, according to the invention, an atom selected from among fluorine, chlorine, bromine and iodine.

By alkyl group, is conventionally meant according to the invention, in the foregoing and in the following, a linear or branch alkyl group comprising from 1 to 20 carbon atoms, a cyclic group comprising from 3 to 20 carbon atoms. Mention may be made from among these groups of the methyl, ethyl, n-propyl, i-propyl, n-butyl, n-dodecanyl, i-butyl, t-butyl, cyclopropyl, cyclohexyl group. These groups may comprise in their chain one or several atoms selected from O, S, Se and/or N.

By aryl group, is conventionally meant according to the invention in the foregoing and in the following, a group with 6 to 20 carbon atoms. Mention may be made from among these groups, of the benzyl, naphthyl, tolyl, biphenyl group.

By alkylaryl group, is conventionally meant according to the invention in the foregoing and in the following, an aryl group with the same definition as given earlier, said group being substituted with at least one alkyl chain, which may include one or several 0, N, Se and/or S atoms.

By perfluoroalkyl, perfluoraryl, perfluoroalkylaryl group, are meant groups for which the hydrogen atoms are totally substituted with fluorine atoms (the alkyls, aryls fitting the same definition as the one given earlier). For example, mention may be made of trifluoromethyl —$CF_3$, perfluoroethyl, perfluorobutyl, perfluoropropyl, perfluoropentyl, perfluorophenyl $C_6F_5$—, perfluorobiphenyl, perfluorobenzyl.

Preferably, the —OH group and the oxime group are located in the ortho position relatively to each other on a same aromatic ring, for example, on a phenyl ring.

Thus, a particular monomer fitting this definition is a monomer fitting the following formula (III):

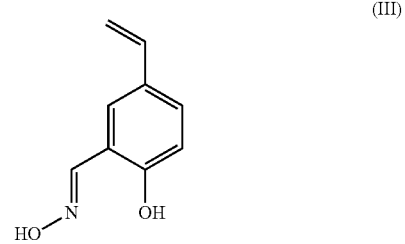

Monomers comprising an alicyclic amine group, may act as a second monomer, may be monomers comprising a cyclame group, such as monomers fitting the following formula (IV):

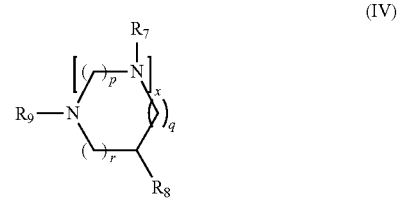

wherein:

$R_7$, $R_8$ and $R_9$ represent a styrenic group; and p, q, r, x are integers ranging from 0 to 20, provided that, when x is equal to 0, (r+q) is at least equal to 2, and when x is equal to 1, at least one of p, q, r is different from 0.

A particular monomer fitting this definition may be a monomer of the following formula (V):

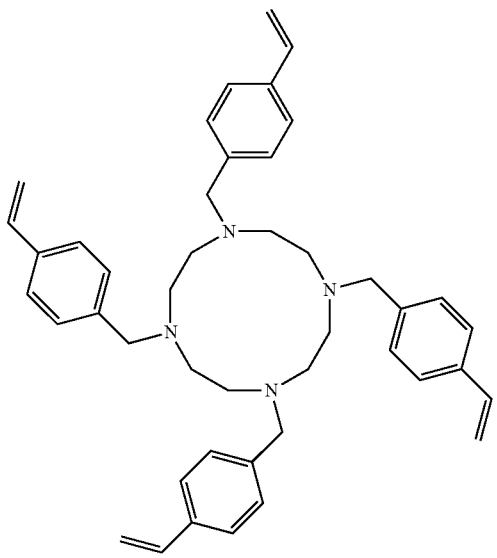 [SMILES: C=Cc1ccc(CN2CCN(Cc3ccc(C=C)cc3)CCN(Cc3ccc(C=C)cc3)CCN(Cc3ccc(C=C)cc3)CC2)cc1]
(V)

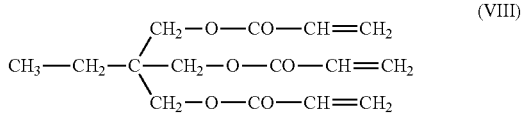
(VIII)

In addition to the aforementioned monomers, the copolymerization step may be carried out in the presence of one or several comonomers, said comonomers being generally different from the aforementioned monomers.

These comonomers may be selected from styrenic monomers and acrylate monomers.

Advantageously, comonomers comprise at least two ethylenic groups thereby ensuring a role of a cross-linking agent. The thereby obtained materials have good mechanical strength.

Comonomers which may be used may be styrenic monomers of the following formula (VI):

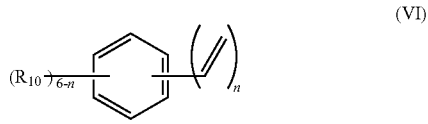
(VI)

wherein the (6-n) $R_{10}$, either identical or different, represent a hydrogen atom, an alkyl group, an aryl group, an —O-aryl group, an —O-alkyl group, an acyl group, an alkylaryl group or a halogen atom, said alkyl, aryl, alkylaryl, —O-aryl, —O-alkyl being optionally perfluorinated and n is an integer ranging from 1 to 3, preferably n being equal to 2.

In particular, a suitable comonomer may be divinylbenzene, in particular 1,4-divinylbenzene.

Comonomers which may be used may also be acrylate compounds of the following formula (VII):

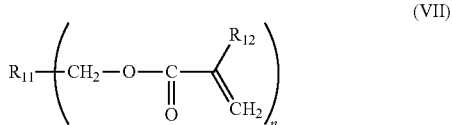
(VII)

wherein $R_{11}$ represents an alkyl group, $R_{12}$ represent H or an alkyl group and n being an integer ranging from 1 to 3.

In particular, a suitable comonomer of this type may be trimethylolpropane triacrylate (known under the acronym of TMPTA) of the following formula (VIII):

The copolymerization step is achieved preferably in the presence of at least one polymerization initiator, such as a radical initiator conventionally selected from among peroxide compounds, azonitriles (such as 2,2'-azobisisobutyronitrile (known under the acronym of AiBN), 2,2'-azodi(2,4-dimethyl-4-methoxyvaleronitrile) (also called V70), azoesters, azoamides.

The polymerization initiator may be introduced, into the polymerization medium, according to variable amounts, for example according to amounts which may range from 0 to 50% by mass, based on the total mass of monomers set into play.

The polymerization step may be achieved additionally, in the presence of at least one pore-forming solvent, which may be a polar or apolar organic solvent and may be selected from ether solvents (such as tetrahydrofurane, 2-methyltetrahydrofurane, 3-methyltetrahydrofurane), dimethylsulfoxide, phthalate solvents (such as dimethylphthalate, dibutylphthalate), alcoholic solvents (such as methanol, ethanol), aromatic solvents (such as toluene, fluorobenzene), ketone solvents and mixtures thereof.

The polymerization method may be of any types, such as thermal polymerization (for example, by heating from 40 to 100° C.) or such as photochemical polymerization in the presence of ultraviolet radiation.

In particular, the step a) may be applied:
in the presence of a monomer of formula (I) with a monomer of formula (III) and of divinylbenzene; or
in the presence of a monomer of formula (I) with a monomer of formula (V) and of divinylbenzene.

At the end of step a), the material may conventionally appear as a gel or further as a porous massive material.

The material may be, after applying step b) or b'), subject to one or several washes, for removing the organic solvent(s) used during step a), this washing may be optionally followed, if necessary by an operation for replacing the washing solvent present in the material with the solvent used for step b) or step b').

When the first metal element and the second metal element are both gold, the method of the invention comprises a step b) for putting the material obtained in a) in contact with an aqueous solution comprising gold, in return for which the gold is complexed to the aforementioned chelating groups, i.e. the chelating groups of the first monomer and the chelating groups of the second monomer.

More specifically, the aqueous solution comprising gold may consist in an aqueous solution, in which is solubilized a salt or a gold complex.

As examples of a salt or gold metal complex, mention may be made of chlorides, bromides, fluorides, iodides, iodates, nitrates, sulfates, sulfonates, sulfites, nitrites, phosphates, phosphites, cyanides, azides, hydroxyls, chlorates, perchlorates, acetates, trifluoromethanesulfonates, trifluoroacetates, trichloroacetates.

Specific examples of a gold salt may be $HAuCl_4$.

From a practical point of view, the contacting step b) may consist in immersing the material obtained in step a) in an aqueous solution comprising a gold salt or complex for a suitable period in order to impregnate the material obtained in step a) and allowing gold to be complexified, both with the complexant groups comprised in the recurrent units from the polymerization of the first monomer and with the complexation of groups comprised in the recurrent units from the polymerization of the second monomer.

When the first metal element and said at least one second metal element are different, the method of the invention comprises a first step for putting the material obtained in a) in contact with an alcoholic solution comprising gold followed by second step for putting the material in contact with an aqueous solution comprising said at least one second metal element.

It is understand that in this case, the complexant groups contained in the recurrent units stemming from the first monomer and the complexant groups contained in the recurrent units stemming from the second monomer should not have complexifying capacities in the same solution, which means, in other words that in our scenario:

the complexant groups contained in the recurrent units stemming from the first monomer complexifying gold in an alcoholic medium, which is not the case of the complexant groups contained in the recurrent units stemming from the second monomer; and the complexant groups contained in the recurrent units stemming from the second monomer complexify the second metal element in an aqueous medium, which is not the case of the complexant groups contained in the recurrent units stemming from the first monomer, which also understands that the complex formed between gold and the complexant groups contained in the recurrent units stemming from the first monomer is stable in an aqueous medium.

More specifically, for the first contacting step, the alcoholic solution comprising gold may consist in an alcoholic solution (for example, an ethanol or methanol solution), in which is solubilized a gold salt or complex.

As examples of a gold metal salt or complex, mention may be made of chlorides, bromides, fluorides, iodides, iodates, nitrates, sulfates, sulfonates, sulfites, nitrites, phosphates, phosphites, cyanides, azides, trifluoromethanesulfonates, trifluoroacetates, trichloroacetates.

Specific examples of a gold salt may be $HAuCl_4$.

The alcoholic solution may be in particular an ethanol solution comprising a gold salt $HAuCl_4$.

From a practical point of view, the first contacting step may consist of immersing the material obtained in step a) in an alcoholic solution comprising a gold salt or complex for a suitable period in order to impregnate the material obtained in step a) and to allow gold to form a complex with the complexant groups comprised in the recurrent units from the polymerization of the first monomer, the complexant groups comprised in the recurrent units stemming from the polymerization of the second monomer remain free because they have a complexant nature in an aqueous medium.

Between the first contacting step and the second contacting step, a step for solvent exchange may be provided, consisting of exchanging the solvent used for the first contacting step (in this case, an alcoholic solvent) with a solvent used for the second contacting step (in this case, water).

For the second contacting step, the aqueous solution comprising said at least one second metal element may consist in an aqueous solution, in which is solubilized a salt or a complex of said at least one second metal element (for example, a copper salt).

As examples of a metal salt or complex of said at least one second metal element, mention may be made of chlorides, bromides, fluorides, iodides, iodates, nitrates, sulfates, sulfonates, sulfites, nitrites, phosphates, phosphites, cyanides, azides, hydroxyls, chlorates, perchlorates, acetates, trifluoromethanesulfonates, trifluoroacetates, trichloroacetates, alkoxides, acetylacetonates, cyclopentadienyls, metal alkynides.

Specific examples of a salt may be $CuCl_2$ or $Cu(NO_3)_2$.

The aqueous solution may in particular be an aqueous solution comprising copper chloride $CuCl_2$.

From a practical point of view, the second contacting step may consist of immersing the already complexed material with gold into an aqueous solution comprising a salt or complex of at least one second metal element for a suitable period in order to impregnate the material and to allow complexation of said at least one second metal element with the complexant groups comprised in the recurrent units stemming from the polymerization of the second monomer.

Independently of the contemplated embodiment (step b) or step b'), the aqueous and/or alcoholic solution may comprise a surfactant compound, when the material from step a) is a porous massive material.

After this step b) or b'), the method of the invention may comprise one or several steps for washing the thereby obtained material, so as to remove the solution comprising a stagnating metal element salt or complex in the porosity of the material.

Finally, the method may comprise, after step b) or b') and the optional washing step, a step for drying the obtained material. This drying step may consist of subjecting said material to heating, to freeze-drying or to drying with supercritical carbon dioxide $CO_2$.

Preferably, the drying step is a $CO_2$ supercritical drying step. To do this, this supercritical drying step with $CO_2$ may be preceded with a solvent exchange step consisting of replacing the solvent present in the porosity of the material with a solvent miscible with $CO_2$. This supercritical drying step with $CO_2$ notably gives the possibility of observing the physical integrity of the material.

By means of the method of the invention, polymeric materials doped with gold are obtained and optionally another metal element, these materials may appear as foams.

In particular, this may be polymeric materials exclusively doped with gold, the gold having for example a mass content greater than 30% and said materials may have a specific gravity of less than 100 mg/cm$^3$.

Still in particular, these may be polymeric materials doped with two distinct metal elements, in which case the second metal element is different from gold, this material may be described as "bimetal" polymeric materials.

For example, the first metal element may be gold and the second metal element may be copper.

Thus, the invention relates to polymeric materials doped with a first metal element, which is gold, and at least with a second metal element, said first metal element and said at least one second metal element being identical or different from each other, which may be obtained by a method as defined above, the materials conventionally appearing as foams.

These materials may be used in many fields requiring the implementation of materials doped with metal elements and notably in the elaboration of laser target elements in particular used in fusion experiments by inertial confinement.

They may also be used as a catalyst, as luminescent materials or as magnetic materials.

In particular, they may be used as a laser target element.

Finally, they may be used as materials with ionic imprint. To do this, the doped materials obtained by the method of the invention may be subject to an acid treatment, intended to remove a portion of the complexed metal elements in said material. The vacant sites thus form specific imprints of the specific element of the initially introduced metal. By this treatment, a so called "with ionic imprint" material results from this, capable of selectively confining the "imprinted" metal element during contacting with a fluid comprising said metal element. This type of materials may thus be used for selective extraction of metals, notably, during the reprocessing of effluents of nuclear fuels, such as the separation of the lanthanides, or further the decontamination of biological fluids.

The invention will now be described with reference to the following examples given as an illustration and not as a limitation.

SHORT DESCRIPTION OF THE UNIQUE FIGURE

The unique FIGURE is a graph illustrating the change in the copper concentration $C_{Cu}$ (in %) versus the immersion period t (in hours), the curves a), b) and c) being respectively those obtained with the gels 1, 2 and 3.

DETAILED DISCUSSION OF PARTICULAR EMBODIMENTS

Example 1

The present example illustrates the synthesis of various polymeric foams doped with gold.

For this, three steps are applied:
a step for synthesizing a complexant monomer of the cyclene type including 4 styrene groups (symbolized hereafter by the acronym TSC) (step a);
a step for forming a polymeric gel by polymerization of said monomer in the presence of another complexant monomer (vinylimidazole) (step b);
a step for immersing the gel obtained into a solution containing a gold salt followed by drying of the thereby immersed gel (step c).

A paragraph d) is dedicated to the obtained results.

a) Synthesis of the TSC Monomer

This step relates to the preparation of the TSC monomer fitting the following formula:

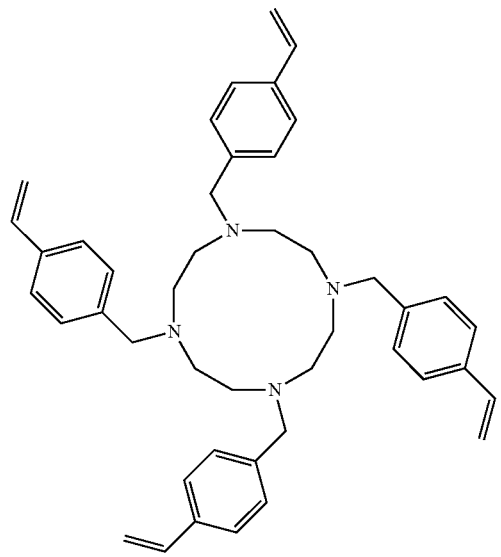

This monomer is prepared from cyclene and from chloromethylstyrene.

To do this, in a two-neck flask surmounted with a condenser and under an argon atmosphere, a solution containing the cyclene (1 g), anhydrous dichloromethane (25 mL) (which allows solubilization of the cyclene), anhydrous acetonitrile (25 mL), triethylamine (8 mL) and chloromethylstyrene (5.7 mL), is stirred and refluxed for 24 hours. The solution is then filtered at room temperature. The residue is washed with acetonitrile (20 mL) and then three times with methanol (50 mL). The solid is recovered and dried in vacuo.

b) Step for Forming the Polymeric Gel

This example illustrates the synthesis of a polymeric gel obtained by polymerization of the TSC monomer, of another complexant monomer (vinylimidazole, symbolized hereafter as VI) and of a cross-linking agent, divinylbenzene (symbolized hereafter DVB).

To do this, in a flask, TSC monomer (0.1386 g), vinylimidazole (0.2772 g), DVB (0.0462 g) and azoisobutyronitrile (AiBN, 0.0462 g) are solubilized with tetrahydrofurane (3 mL). Next, a pore-forming solvent (diethyl phthalate, symbolized hereafter as DEP) (9 mL) is added. The solution is degassed with an inert gas (argon) for 5 minutes. Next, the solution (in an amount of 1 mL in each mold) is injected into cylindrical molds placed under an inert atmosphere. Polymerization is carried out at 60° C. for 24 hours. The gels are removed from the molds in an ethanol solution, which is changed three times.

c) Step for Immersing the Gels Obtained, Followed by Drying

This immersion step is achieved according to different methods:
a method according to the invention, in which the immersion is carried out in an aqueous medium;
a method non-compliant with the invention, in which the immersion is carried out in an alcoholic medium.

Method According to the Invention

To do this, a gel obtained according to step b) is subject to a solvent exchange, i.e. to an exchange of ethanol with water. More specifically, the ethanol is gradually changed with water by successive putting the gel into contact with the following solutions: an ethanol solution with 100% water, an ethanol/water solution 75/25 (v/v), a 50/50 (v/v) ethanol/water solution, a 25/75 (v/v) ethanol/water solution, and distilled water.

The gel is then immersed for 48 hours in an aqueous solution of a gold salt, $HAuCl_4*3H_2O$ (18 mL; Au=8.9 mg/mL). Next, the gel is washed three times with this aqueous solution. The aqueous solution is then gradually exchanged with ethanol by successive contactings of the gel with the following solutions: water, 25/75 (v/v) ethanol/water solution, 50/50 (v/v) ethanol/water solution, 75/25 (v/v) ethanol/water solution and a 100% ethanol solution.

The gel is then dried by supercritical $CO_2$ drying, in return for which a foam results.

Method Non-Compliant with the Invention

The gel obtained in step b) is immersed for 48 hours in an ethanol solution of a gold salt, $HAuCl_4*3H_2O$ (18 mL; Au=8.9 mg/mL). Next, the gel is washed three times with this ethanol solution.

The gel is then dried by supercritical $CO_2$ drying, in return for which a foam results.

d) Results

The foam obtained according to the method compliant with the invention has a specific surface area of 156±10 m²/g and a gold mass content of 39.8±2.0.

The obtained foam according to the method non-compliant with the invention has a specific surface area of 112±2 m²/g and a gold mass content of 32.1±1.3.

Thus, the inventors were surprisingly able to show that the application of the step for immersion in an aqueous medium contributes to increasing the gold content in the final material.

Without being bound by theory, the authors were able to ascribe this technical effect to the capability of the TSC monomer of forming a complex with gold in a more efficient way in an aqueous medium than in a alcoholic medium.

Indeed, by reproducing the example above, with exclusively TSC and DVB (in an amount of a 50/50 mass proportion) and by carrying out the immersion step in an ethanol solution, the obtained material only includes a gold content of 10.3±0.4.

As a counterpart, by reproducing the example above, with exclusively VI and DVB (in an amount of a 50/50 mass proportion) and by carrying out the immersion step in an ethanol solution, the material obtained only includes a gold content of 25.8±1.2, a specific surface area of 160±15 m²/g and a specific gravity of 88.5±3.8 mg/cm³.

Example 2

The present example illustrates the synthesis of different gold-doped polymeric foams.

To do this, three steps are applied:

a step for synthesizing a complexant monomer: 5-iodosalicylaldoxime (symbolized hereafter by the acronym VSO) (step a);

a step for forming a polymeric gel by polymerization of said monomer in the presence of another complexant monomer (vinylimidazole) (step b);

a step for immersing the obtained gel in a solution containing a gold salt following by drying of the thereby immersed gel (step c).

A paragraph d) is dedicated to the obtained results.

a) Synthesis of 5-iodosalicylaldoxime

This step illustrates the preparation of 5-iodosalicylaldoxime of the following formula:

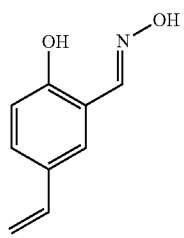

This monomer is made according to the following synthesis scheme:

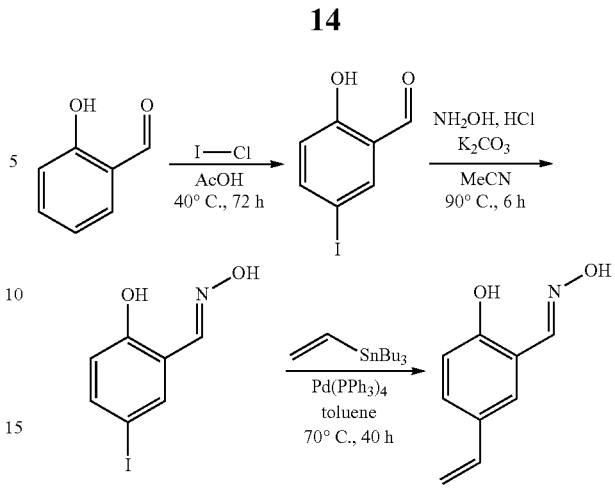

AcOH meaning acetic acid, MeCN meaning acetonitrile, Ph meaning phenyl, and Bu meaning n-butyl.

Thus, the first step consists from salicylaldehyde of making 5-iodosalicylaldehyde.

In a two-neck flask of 500 mL provided with a condenser are placed with stirring 160 mL of glacial acetic acid and 1.4 mL (100 mmol) of salicylaldehyde. A solution of 10 g (1.1 eq., 110 mmol) of iodine monochloride dissolved in a minimum of acetic acid is then added to the mixture. The reaction is maintained with stirring at T=40° C. for 8 days. The solvent is then evaporated and the residue is solubilized with diethyl ether (200 mL). The resulting solution is washed three times with the following solutions:

(i) an aqueous solution saturated with sodium thiosulfate (Na₂S₂O₃, 100 mL);

(ii) a solution saturated with NaCl (100 mL); and (iii) distilled water (150 mL).

The solvent is then evaporated and the product is recrystallized in a heptane/diethyl ether (50:50) mixture. The crystals are recovered by filtration on a Frit. They are washed with heptane and recrystallized in dichloromethane.

The second step consists of producing 5-iodosalicylaldoxime from the 5-iodosalicylaldehyde prepared beforehand.

To do this, 35 mmol (3.5 eq., 2.40 g) of hydroxylamine hydrochloride (NH₂OH.HCl) are added to a solution of 4 g of K₂CO₃ (35 mmol, 3.5 eq.) and of 5-iodosalicylaldehyde (10 mmol, 2.50 g) in 50 mL of acetonitrile. The mixture is heated to 70° C. with stirring for 24 hours.

At room temperature, the solution is filtered on a Buchner and the solid residue is removed. The filtrate is then evaporated. The residue is taken up in water (250 mL). The pH is adjusted to 4 by adding a solution of hydrochloric acid. The product is extracted with dichloromethane. The organic phase is dried on MgSO₄, filtered and then the solvent is evaporated. The solid is then purified by chromatography on a silica column (eluant: 80/20 heptane/diethyl ether) and then the filtrate is evaporated.

The third step finally consists of producing 5-vinylsalicylaldoxime from the 5-iodosalicylaldoxime prepared beforehand.

To do this, in a Schlenk tube of 300 mL, dried under Grignard conditions and purged with argon are introduced successively, with stirring and in this order, 3.94 g (15 mmol) of 5-iodosalicylaldoxime, 30 mL of anhydrous toluene, 879 mg (5% by moles) of Pd(PPh₃)₄ and 6.60 mL of vinyltin CH₂=CH—SnBu₃ (Bu meaning n-butyl). The mixture is degassed, purged with argon and heated to 70° C. with intense stirring for 48 hours.

At the end of the reaction, the solution is filtered on celite (with the diethyl ether solvent). The solvents of the filtrate are evaporated.

The residue is purified by a chromatographic column (eluants: 400 mL of heptane, 500 mL of a 95:5 heptane/diethyl ether and 90:10 heptane/diethyl ether mixture.

b) Step for Forming the Polymeric Gel

This example illustrates the synthesis of a polymeric gel obtained by polymerization of the VSO monomer, of another complexant monomer (vinylimidazole, symbolized hereafter as VI) and of a cross-linking agent, divinylbenzene (symbolized hereafter as DVB).

To do this, in a flask, VI monomer (0.16065 g), VSO (0.16065 g), DVB (0.1377 g) and azoisobutyronitrile (AiBN, 0.0459 g) and a pore-forming solvent DEP (9 mL) are degassed for 5 minutes with an inert gas (argon). Next, the solution (in an amount of 1 mL in each mold) is injected into cylindrical molds placed under an inert atmosphere. The polymerization is carried out at 80° C. for 24 hours. The gels are removed from the molds in an ethanol solution, which is changed three times.

c) Step for Immersing the Obtained Gels Followed by Drying

This immersion step is carried out according to different methods:
  a method according to the invention, in which the immersion is carried out in an aqueous medium;
  a method non-compliant with the invention, in which the immersion is carried out in an alcoholic medium.
Method According to the Invention To do this, a gel obtained according to step b) is subject to a solvent exchange, i.e. an exchange of the ethanol with water. More specifically, the ethanol is gradually changed with water by successive contactings of the gel with the following solutions: an ethanol solution with 100% water, a 75/25 (v/v) ethanol/water solution, a 50/50 (v/v) ethanol/water solution, a 25/75 (v/v) ethanol/water solution, and distilled water.

The gel is then immersed for 48 hours in an aqueous solution of a gold salt, $HAuCl_4*3H_2O$ (18 mL; Au=8.9 mg/mL). Next, the gel is washed three times with this aqueous solution. The aqueous solution is then gradually exchanged with ethanol by successive contactings of the gel with the following solutions: water, a 25/75 (v/v) ethanol/water solution, a 50/50 (v/v) ethanol/water solution, a 75/25 (v/v) ethanol/water solution and a 100% ethanol solution.

The gel is then dried by supercritical $CO_2$ drying, in result for which a foam results.
Method Non-Compliant with the Invention The gel obtained in step b) is immersed for 48 hours in an ethanol solution of a gold salt, $HAuCl_4*3H_2O$ (18 mL; Au=8.9 mg/mL). Next, the gel is washed three times with this ethanol solution.

The gel is then dried by supercritical $CO_2$ drying, in return for which a foam results.

d) Results

The obtained foam according to the method compliant with the invention has a specific surface area of 219±10 $m^2/g$, a gold mass content of 41.5±1.7 and a specific gravity of 93.4±4.3 $mg/cm^3$.

The foam obtained according to the method non-compliant with the invention has a specific surface area of 277±15 $m^2/g$ and a gold mass content of 15.7±0.6.

Thus, the inventors have surprisingly been able to show that the application of the immersion step in an aqueous medium contributes to substantial increase in the gold content in the final material.

Without being bound by theory, the authors were able to ascribe this technical effect to the capability of the VSO monomer of forming a complex with gold in an aqueous medium and not in an alcoholic medium.

Indeed, by reproducing the example above, with exclusively VSO and DVB (in an amount of a 50/50 mass proportion) and by carrying out the immersion step in an ethanol solution, the obtained material only includes a gold content of 0.5±0.0, this low content giving the possibility of concluding that this monomer does not allow complexation of gold in such a medium. The low measured gold content in the material may result from a deposition of gold by absorption in the porosity of the material.

As a counterpart, by reproducing the example above, with exclusively VSO and DVB (in an amount of a 50/50 mass proportion) and by carrying out the immersion step in water, the obtained material includes a gold content of 37.0±0.3, which confirms the exceptional capability of VSO of forming a complex with gold in an aqueous medium. Without being bound by theory, this result may be ascribed to an aurophilicity phenomena, i.e. mutual attraction of gold atoms. As to the specific gravity of the material, it is of 200±9 $mg/cm^3$. Also the conclusion may be drawn that the association of the VSO monomer with the VI monomer gives the possibility of both increasing the gold content but also reducing the specific gravity to below 100 $mg/cm^3$.

Thus, the method of the invention may give the possibility of maximizing the gold content while controlling the final specific gravity of the material.

As a conclusion, with regard to examples 1 and 2, the gold-doped materials obtained according to the methods of the invention have a mass content around 40% but the specific surface area of the materials differs. Thus, according to the desired properties, the association of at least two complexant monomers according to the methods of the invention give the possibility of both modulating the gold content but also the morphological properties.

Example 3

The present example illustrates the synthesis of a bimetal gold-copper foam according to the methods of the invention.

To do this, a gel obtained in step b) of example 2 is immersed, in a first phase, for 24 hours in an ethanol solution of a gold salt, $HAuCl_4*3H_2O$ (18 mL; Au=3 mg/mL). During this step, the recurrent units stemming from the polymerization of the VI monomer capture gold.

After this step, the gel is washed three times with ethanol and then the resulting gel is subject to a solvent exchange, i.e. to an exchange of ethanol with water. More specifically, the ethanol is gradually changed with water by successive contactings of the gel with the following solutions: an ethanol solution with 100% water, a 75/25 (v/v) ethanol/water solution, a 50/50 (v/v) ethanol/water solution, a 25/75 (v/v) ethanol/water solution, and distilled water.

The gel is then immersed for 24 hours in an aqueous solution of a copper salt $CuCl_2$ (18 mL; Cu=3 mg/mL). During this step, the recurrent units from the polymerization of the VSO monomer capture copper.

Next, the gel is washed three times with this aqueous solution. The aqueous solution is then gradually exchanged with ethanol by successive contactings of the gel with the following solutions: water, a 25/75 (v/v) ethanol/water solution, a 50/50 (v/v) ethanol/water solution, a 75/25 (v/v) ethanol/water solution and a 100% ethanol solution.

The gel is then dried by supercritical $CO_2$ drying in return for which a foam results.

The copper is exclusively complexed by the recurrent units stemming from VSO, because the complexation occurs in an aqueous medium, the complexant functions of VSO not being occupied with gold during the first immersion, because this first immersion occurs in an alcoholic medium.

Without being bound by theory, the following results from the following complementary tests:
- a test conducted with a gel made in an ethanol medium only comprising recurrent units stemming from the polymerization of the VSO monomer (a so called gel 1);
- a test conducted with a gel exclusively comprising recurrent units stemming from the polymerization of the VI monomer complexed with gold in an ethanol medium (a so called gel 2); and
- a test conducted with a gel comprising recurrent units stemming from the polymerization of the VI monomer complexed with de gold in an ethanol medium and comprising free recurrent units stemming from the polymerization of the VSO monomer (a so called gel 3).

After gradual exchange of the ethanol with water, the gels are immersed in an aqueous copper solution for a period ranging up to 7 hours. The concentration of the copper solution is measured versus the immersion period of the relevant gel. The results are reported in the single FIGURE which is a graph illustrating the time-dependent change in the copper concentration $C_{Cu}$ (in %) versus the immersion period t (in hours), the curves a), b) and c) being respectively those obtained with the gels 1, 2 and 3.

The gel 2 does not form a complex with copper. This result confirms that the formation of the gold complex is stable in an aqueous solution at pH=4.

The gel 1 gives the possibility, after 7 hours of immersion, of reducing the copper concentration of the immersion solution by 10%.

The gel 3 gives the possibility, after 7 hours of immersion, of reducing the copper concentration of the immersion solution by 13%. In this gel, the capture of the copper is achieved by means of the VSO monomer. This capture confirms that the complexant functions of the monomer were not occupied by gold atoms stemming from the first immersion step.

The invention claimed is:

1. A method for preparing a polymeric material doped with a first metal element, which is gold, and at least one second metal element, said first metal element and said at least one second metal element being identical or different from each other, said method comprising:
   a) a step for copolymerization of at least one first monomer comprising at least one chelating group of said first metal element and of at least one second monomer comprising at least one chelating group, of at least a second metal element, in return for which a polymeric material is obtained comprising recurrent units stemming from the polymerization of said first monomer, which recurrent units comprise at least one chelating group of said first metal element and comprising recurrent units stemming from the polymerization of said second monomer, which recurrent units comprise at least one chelating group of said at least one second metal element, said second monomer selected from the group consisting of:
   aromatic monomers comprising at least one aromatic ring, which ring comprises at least one ethylenic group, at least one hydroxide group —OH, at least one oxime group and the optional salts thereof; and
   monomers comprising an alicyclic amine group; and
   said first monomer being a cyclic monomer comprising at least one nitrogen-containing group, wherein the first monomer is a heteroaromatic monomer comprising one or several nitrogen atoms;
   b) when the first metal element, and said at least one second metal element are identical, a step for putting the material obtained in a) in contact with an aqueous solution comprising gold, in return for which the gold is complexed to the aforementioned chelating groups; and
   b') when the first metal element and said at least one second metal element are different, a first step for putting the material obtained in a) in contact with an alcoholic solution comprising gold followed by a second step for putting the material in contact with an aqueous solution comprising said at least one second metal element.

2. The method according to claim 1, wherein the first monomer is a vinylimidazole monomer.

3. The method according to claim 1, wherein the first monomer is a monomer of the following formula (I):

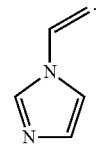

(I)

4. The method according to claim 1, wherein the second monomer fits the following formula (II):

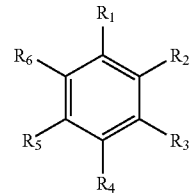

(II)

wherein:
  $R_1$ is an ethylenic group;
  $R_2$, $R_3$, $R_4$, $R_5$ and $R_6$ represent independently of each other, a hydrogen atom, an —OH group, an amine group, a —CHO group, an oxime group, a hydrazone group, a carboxylic group —COOH, a halogen atom, a trialkylsilane group, and the optional salts thereof, provided that at least one of the groups $R_2$ to $R_6$ represents an —OH group and at least one of the groups $R_2$ to $R_6$ represents an oxime group.

5. The method according to claim 1, wherein the second monomer fits the following formula (III):

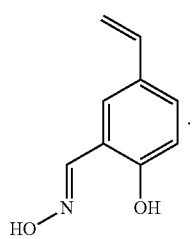
(III)

6. The method according to claim 1, wherein the second monomer is a monomer comprising a cyclame group fitting the following formula (IV):

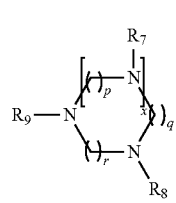
(IV)

wherein:
R$_7$, R$_8$ and R$_9$ represent a styrenic group; and
p, q, r, x are integers ranging from 0 to 20, provided that, when x is equal to 0, (r+q) is at least equal to 2, and when x is equal to 1, at least one of p, q, r is different from 0.

7. The method according to claim 6, wherein the second monomer fits the following formula (V):

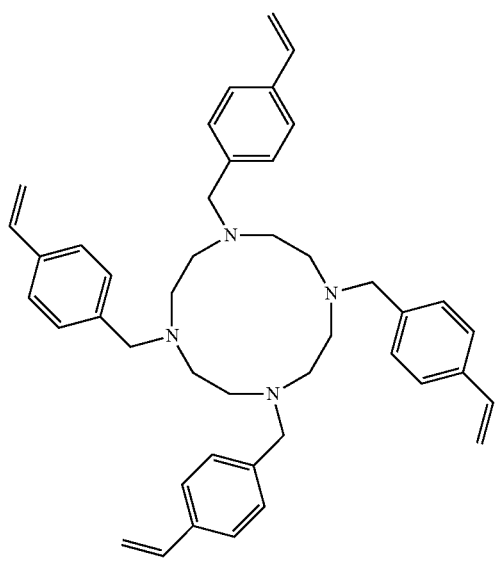
(V)

8. The method according to claim 1, wherein the copolymerization step is achieved in the presence of one or several comonomers.

9. The method according to claim 8, wherein the comonomer(s) is (are) selected from styrenic monomers and acrylate monomers.

10. The method according to claim 8, wherein the comonomer(s) comprise(s) at least two ethylenic groups.

11. The method according to claim 9, wherein the comonomer(s) fit(s) one of the following formulae (VI) or (VII):

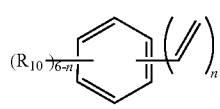
(VI)

wherein the (6-n) R$_{10}$, either identical or different, represent a hydrogen atom, an alkyl group, an aryl group, an —O-aryl group, an —O-alkyl group, an acyl group, an alkylaryl group or a halogen atom, said alkyl, aryl, alkylaryl, —O-aryl, —O-alkyl groups being optionally perfluorinated and n is an integer ranging from 1 to 3;

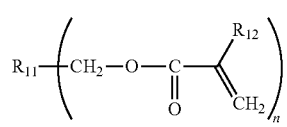
(VII)

wherein R$_{11}$ represents an alkyl group, R$_{12}$ represents H or an alkyl group and n is an integer ranging from 1 to 3.

12. The method according to claim 1, wherein the copolymerization step is carried out in the presence of at least one polymerization initiator.

13. The method according to claim 1, wherein the copolymerization step is carried out in the presence of at least one pore-forming solvent, which is a polar or apolar organic solvent selected from the group consisting of ether solvents, dimethylsulfoxide, phthalate solvents, alcoholic solvents, aromatic solvents, ketone solvents and mixtures thereof.

14. The method according to claim 1, wherein step a) is applied:
in the presence of a first monomer, which is the monomer of formula (I):

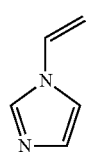
(I)

with a second monomer, which is a monomer of formula (III):

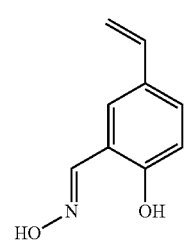
(III)

and of divinylbenzene; or
in the presence of a first monomer, which is a monomer of formula (I):

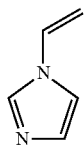 (I)

with a second monomer which is a monomer of formula (V):

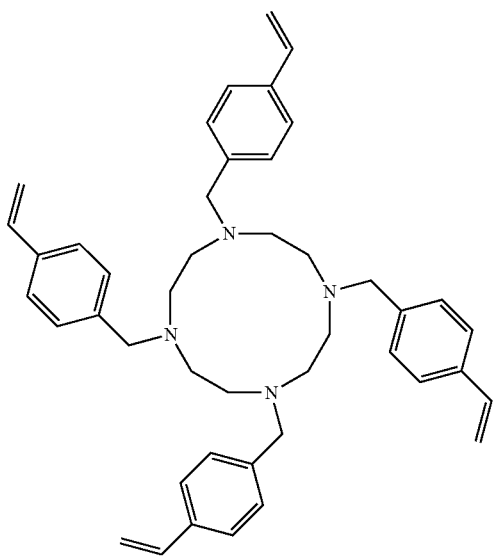 (V)

and of divinylbenzene.

15. The method according to claim 1, wherein, in step b), the aqueous solution comprising gold is an aqueous solution, in which is solubilized a gold salt or complex.

16. The method according to claim 1, wherein, in step b'), the alcoholic solution comprising gold is an alcoholic solution, in which is solubilized a gold salt or complex.

17. The method according to claim 16, wherein the alcoholic solution is an ethanol solution comprising a gold salt $HAuCl_4$.

18. The method according to claim 16, wherein, in step b'), between the first contacting step and the second contacting step, a solvent exchange step is provided, consisting of exchanging the alcoholic solvent used for the first contacting step with water.

19. The method according to claim 1, wherein, in step b'), the aqueous solution comprising said at least one second metal element is an aqueous solution, in which is solubilized a salt or complex of said at least one second metal element.

20. The method according to claim 19, wherein the salt of at least one second metal element is a copper salt.

21. The method according to claim 1, further comprising a step for drying the material stemming from step b) or from step b').

22. The method according to claim 21, wherein the drying step is a supercritical drying step.

23. The method according to claim 1, wherein the material obtained at the end of the method is a foam.

24. A polymeric material doped with a first metal element, which is gold, and at least one second metal element, said first metal element and said at least one second metal element being identical or different from each other, obtained by a method as defined according to claim 1.

25. The polymeric material according to claim 24, wherein the second metal element is gold.

26. The polymeric material according to claim 25, which has a gold mass content greater than 30% and a specific gravity of less than 100 $g/m^3$.

27. The polymeric material according to claim 24, wherein the second metal element is different from gold.

28. The polymeric material according to claim 27, wherein the second metal element is copper.

* * * * *

UNITED STATES PATENT AND TRADEMARK OFFICE
CERTIFICATE OF CORRECTION

PATENT NO. : 10,030,114 B2
APPLICATION NO. : 15/313336
DATED : July 24, 2018
INVENTOR(S) : Stéphane Cadra et al.

Page 1 of 1

It is certified that error appears in the above-identified patent and that said Letters Patent is hereby corrected as shown below:

In the Specification

Column 9, Line 40, after "azides," please insert -- hydroxyls, chlorates, perchlorates, acetates, --.

Signed and Sealed this
Twenty-fifth Day of September, 2018

Andrei Iancu
*Director of the United States Patent and Trademark Office*